United States Patent
Stephan et al.

(10) Patent No.: US 7,097,138 B2
(45) Date of Patent: Aug. 29, 2006

(54) OVERHEAD LUGGAGE CONTAINER, PARTICULARLY FOR AIRPLANES

(75) Inventors: Walter Alfred Stephan, St. Martin (AT); Hermann Filsegger, Ried im Innkreis (AT); Erich Pamminger, Weilbach (AT)

(73) Assignee: Fisher Advanced Composite Components AG, Ried im Innkreis (AT)

( * ) Notice: Subject to any disclaimer, the term of this patent is extended or adjusted under 35 U.S.C. 154(b) by 0 days.

(21) Appl. No.: 10/489,951

(22) PCT Filed: Sep. 16, 2002

(86) PCT No.: PCT/AT02/00267

§ 371 (c)(1),
(2), (4) Date: Oct. 6, 2004

(87) PCT Pub. No.: WO03/031260

PCT Pub. Date: Apr. 17, 2003

(65) Prior Publication Data
US 2005/0040287 A1    Feb. 24, 2005

(30) Foreign Application Priority Data
Oct. 9, 2001    (AT) .............................. A 1590/2001

(51) Int. Cl.
*B64C 11/06* (2006.01)
(52) U.S. Cl. .................................................. 244/118.6
(58) Field of Classification Search ............. 244/118.5, 244/118.6, 118.1, 118.2, 119; 49/126, 197–206; 248/202.1, 343; 312/248, 245
See application file for complete search history.

(56) References Cited

U.S. PATENT DOCUMENTS

| | | | | |
|---|---|---|---|---|
| 4,275,942 A | | 6/1981 | Steidl | |
| 5,108,048 A | * | 4/1992 | Chang | 244/118.1 |
| 5,383,628 A | * | 1/1995 | Harriehausen et al. | 244/118.1 |
| 5,395,074 A | * | 3/1995 | Hart et al. | 244/118.1 |
| 5,549,258 A | * | 8/1996 | Hart et al. | 244/118.1 |
| 5,785,202 A | * | 7/1998 | Stephan | 220/622 |
| 5,817,409 A | * | 10/1998 | Stephan et al. | 428/219 |

(Continued)

FOREIGN PATENT DOCUMENTS

DE    200 16 405 U1    2/2002

(Continued)

*Primary Examiner*—Teri Pham Luu
*Assistant Examiner*—S. A. Holzen
(74) *Attorney, Agent, or Firm*—Jacobson Holman PLLC

(57) ABSTRACT

The invention relates to an overhead luggage container (1), particularly for airlines, comprising a reinforcing structure (11) which is connected to the container (1) and which is disposed essentially in the direction of the longitudinal extension of the container (1), and at least one device (5) for suspension on a carrying structure (2) of the plane. In order to create a container (1) which can be subjected to relatively high static strain without running the risk that the container (1) will fall on the passengers sitting below, while at the same time reducing technical complexity in production and reducing the weight of the container, at least one respective rigid connecting element (17) is arranged to the side of the container (1) between the reinforcing structure (11) and the suspension device (5) in a substantially vertical manner with respect to the longitudinal extension of the container (1). The connecting element (17) is used to transmit forces exerted by the luggage on the container (1) and to deflect them to the suspension devices (5) and carrying structure (2) of the plane, thereby relieving the amount of strain placed on the side walls (12).

21 Claims, 6 Drawing Sheets

U.S. PATENT DOCUMENTS

| | | | |
|---|---|---|---|
| 5,820,076 A * | 10/1998 | Schumacher et al. | 244/118.5 |
| 5,839,694 A * | 11/1998 | Bargull et al. | 244/118.1 |
| 5,842,668 A * | 12/1998 | Spencer | 244/118.1 |
| 5,934,615 A * | 8/1999 | Treichler et al. | 244/118.5 |
| 5,938,149 A * | 8/1999 | Terwesten | 244/118.5 |
| 5,988,565 A * | 11/1999 | Thomas et al. | 244/118.1 |
| 6,007,024 A * | 12/1999 | Stephan | 244/118.1 |
| 6,045,204 A * | 4/2000 | Frazier et al. | 312/247 |
| 6,062,509 A * | 5/2000 | Burrows et al. | 244/118.5 |
| 6,199,798 B1 * | 3/2001 | Stephan et al. | 244/129.4 |
| 6,241,186 B1 * | 6/2001 | Calnon | 244/118.5 |
| 6,398,163 B1 * | 6/2002 | Welch et al. | 244/118.1 |
| 6,527,325 B1 * | 3/2003 | Steingrebe et al. | 296/37.7 |
| 6,598,829 B1 * | 7/2003 | Kamstra | 244/118.1 |
| 6,814,331 B1 * | 11/2004 | Hessling | 244/119 |
| 6,883,753 B1 * | 4/2005 | Scown | 244/118.1 |
| 2001/0011692 A1 * | 8/2001 | Sprenger et al. | 244/118.5 |
| 2004/0016847 A1 * | 1/2004 | Ritts | 244/118.5 |
| 2004/0135030 A1 * | 7/2004 | Lau et al. | 244/118.1 |
| 2004/0140398 A1 * | 7/2004 | Lau et al. | 244/118.1 |

FOREIGN PATENT DOCUMENTS

| | | |
|---|---|---|
| EP | 0 557 267 A1 | 8/1993 |
| EP | 0 658 644 A2 | 6/1995 |
| EP | 0 718 189 A1 | 6/1996 |
| EP | 0 767 100 A1 | 4/1997 |
| EP | 0 861 781 A2 | 9/1998 |

* cited by examiner

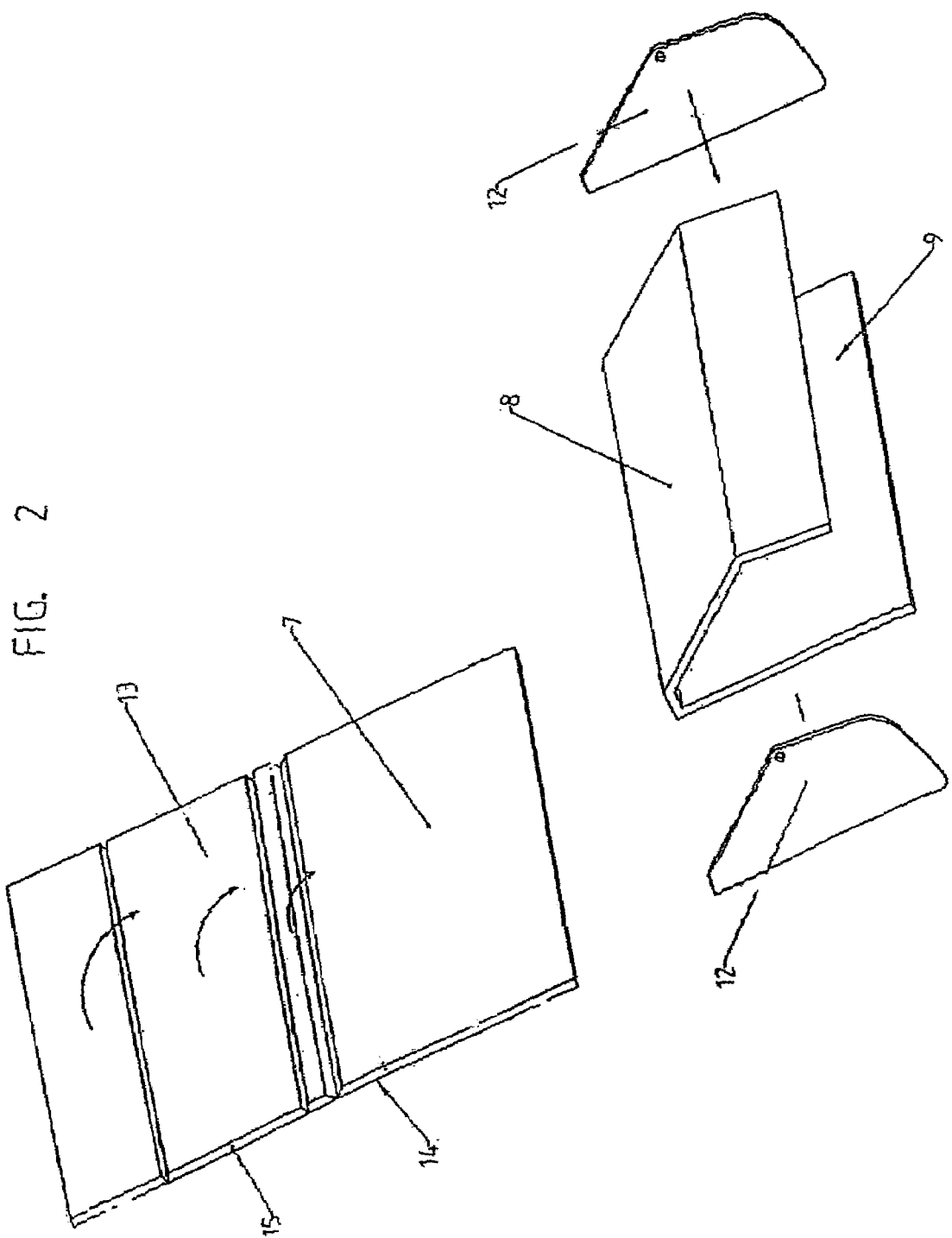

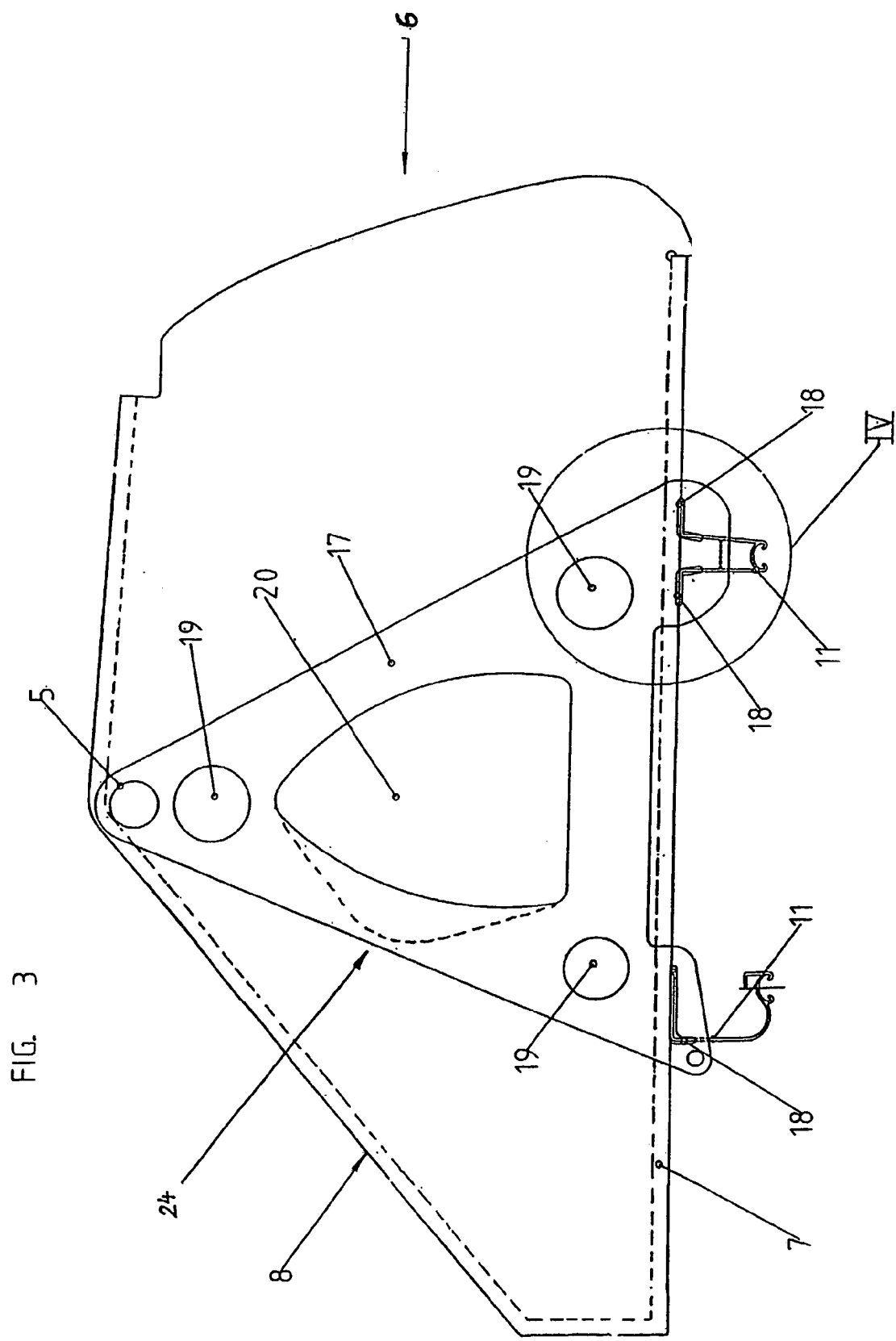

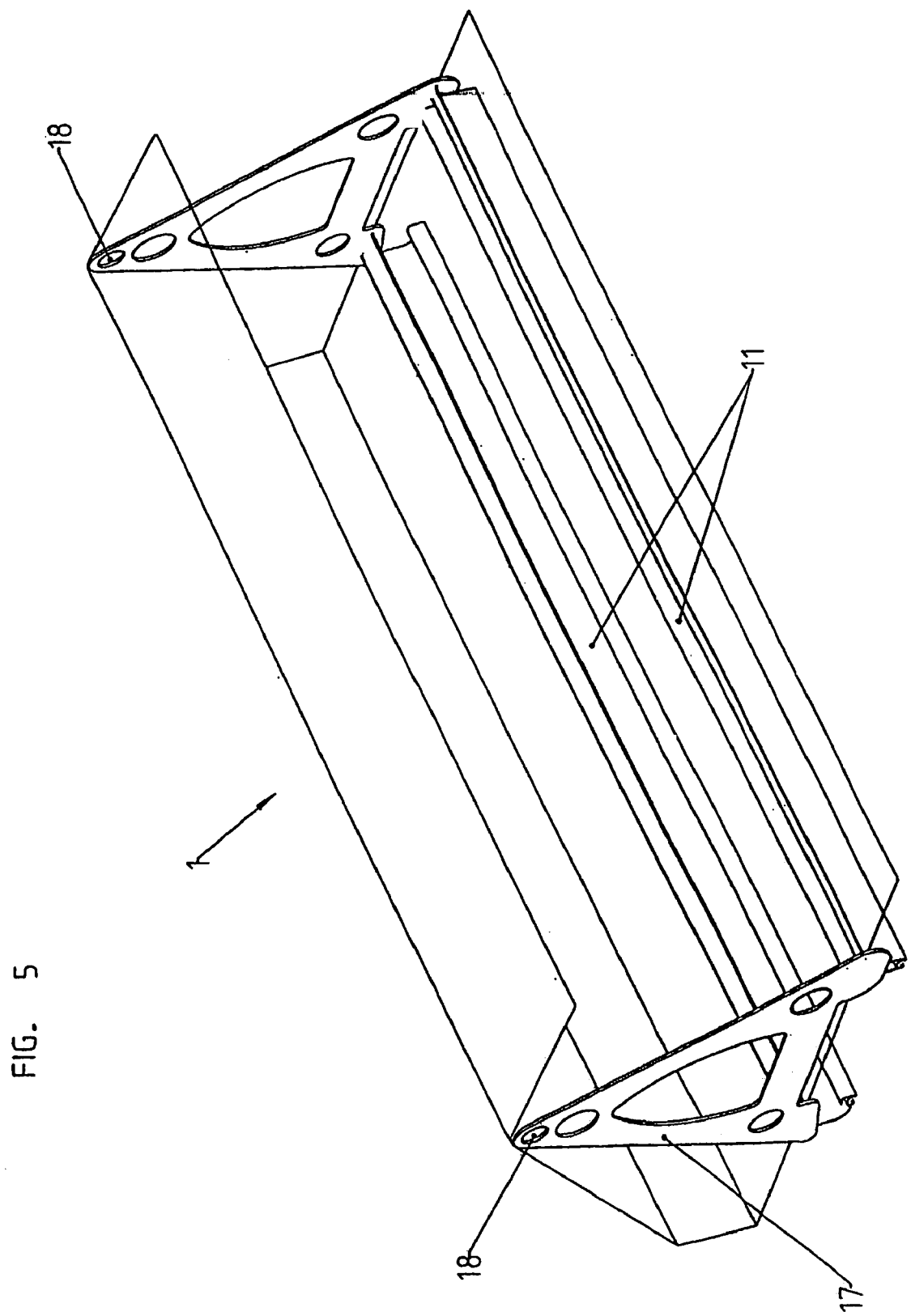

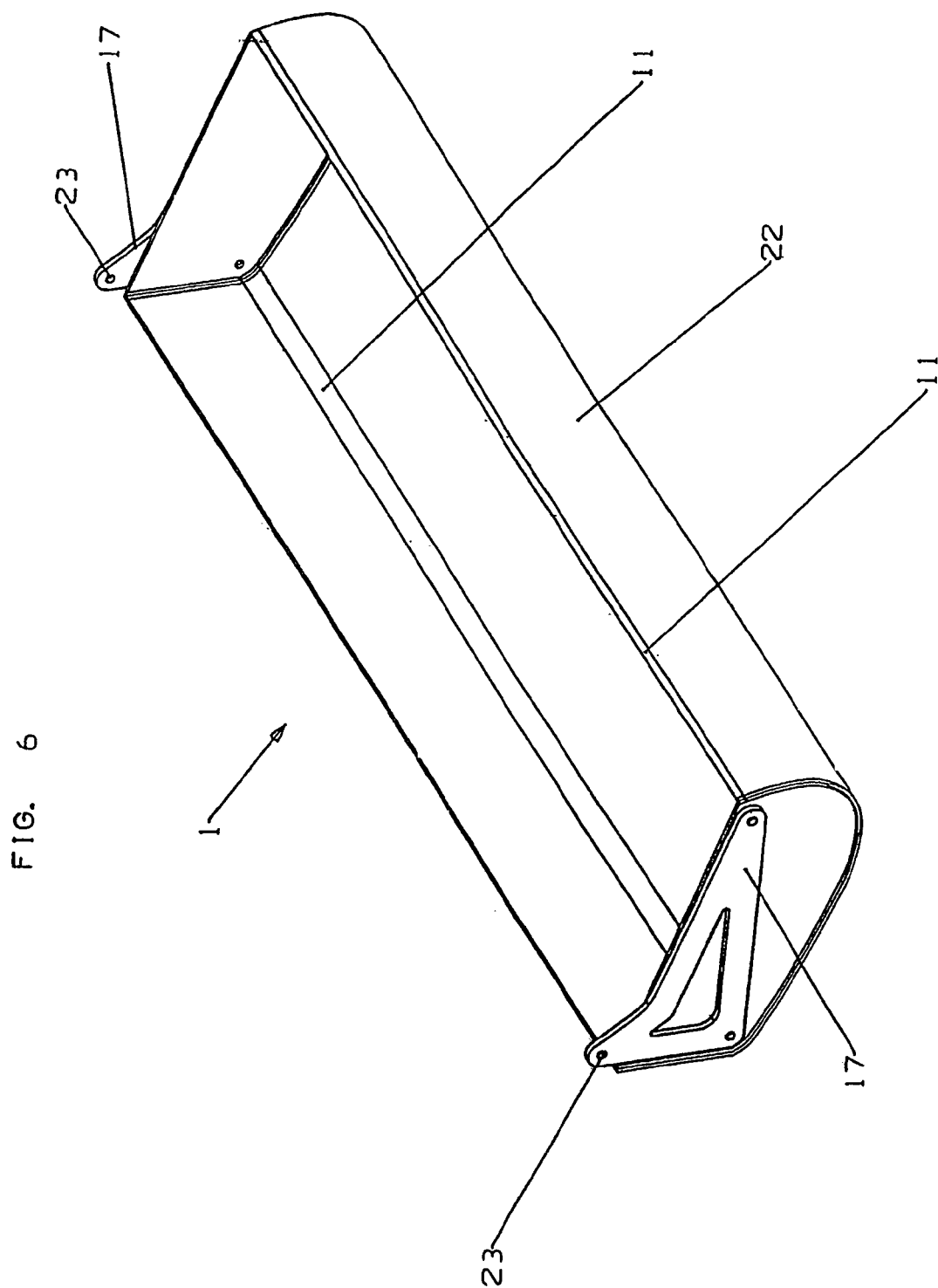

OVERHEAD LUGGAGE CONTAINER, PARTICULARLY FOR AIRPLANES

This is a nationalization of PCT/AT02/00267 filed Sep. 16, 2002 and published in German.

BACKGROUND OF THE INVENTION

1. Field of the Invention

The invention relates to an overhead luggage stowage container, particularly for airplanes, including at least one reinforcing structure connected with the container and arranged substantially in the direction of the longitudinal extension of the container, and at least one device for suspension from a supporting structure of the airplane or the like.

2. Description of the Related Art

Overhead luggage stowages are used, in particular, in airplanes to store passengers' hand luggages during flights. Yet, also overhead stowages for other transport means such as, for instance, rail-bound vehicles and, preferably, high-speed trains as well as buses or ships are covered by the present invention. Overhead stowages in airplanes are subject to extremely high mechanical loads, particularly during the take-off and landing phases as well as during the flight and in emergency cases, for which reason overhead luggage stowages for airplanes will have to be designed to withstand particularly high loads. Those high demands placed on luggage stowage containers drastically increase production expenditures and in most cases also involve increased dead weights.

These days, overhead luggage stowages, particularly for airplanes, in most cases are produced of plastics materials through sandwich construction with cores usually made of honeycomb materials and covered by overlays of plastics materials optionally reinforced with glass or carbon fibers. Overhead luggage stowages can be comprised of bent-around trays manufactured of an above-described material by multi-fold bending or folding. The container can also be produced in an autoclave by the curing of prepreg layers arranged on a mold. The stowage in most cases will further comprise an opening which may advantageously be closed by flaps. EP 0 557 267 B1, for instance, describes such an overhead luggage stowage and a method for its production. Since the substantially vertical side walls of the luggage stowage are subject to high loads caused by vertically directed forces, these side walls and their connection with the bent-around tray of the luggage stowage will have to be produced in a particularly stable and complex manner. This results in an increased weight of the luggage stowage, on the one hand, and in elevated production costs, on the other hand.

Also EP 0 658 644 A2 describes an overhead luggage stowage, which is comprised of structural components having particularly low weights while simultaneously offering high stability.

EP 718 189 A1 discloses an overhead luggage stowage having an increased loading capacity and intended for the retrofitting of existing airplanes, thus being compatible with existing suspension devices for overhead luggage stowages. The overhead luggage stowages according to that document are, however, not specifically designed for the increased static loads exerted by the luggage items contained therein.

In terms of mechanics, overhead luggage stowages, particularly for airplanes, intended for passengers' luggages or the like are usually designed for two situations. One situation comprises the normal, regular flight operation, in which the stowage is to withstand without damage specific loads caused, for instance, by air gusts, particularly during take-off and landing. During take-off and landing or in the event of air gusts, accelerations which may, for instance, be six times as high as the gravitational acceleration will be caused by the inertia of the load contained in the luggage stowage. Such values are common particularly in the tails or noses of planes. The second case of load results from an emergency situation, which may occur, for instance, at an emergency or crash landing of a plane. In order to be able to guarantee the passengers' safety in such a case, the baggage stowages are, as a rule, designed to withstand 1.5 times the normal load, which means, for instance, loads equalling nine times the gravitational acceleration. Those high loads place particularly high manufacturing demands on the baggage stowages and, in particular, on the side walls and their connections with the bent-around tray of the overhead baggage stowage.

Nowadays, an increasing number of increasingly heavy luggage items such as small suitcases, laptops, photographic and video equipments, etc. are taken into airplane cabins as hand luggages. In practice, the permissible overall load of luggage stowages is frequently exceeded. In an emergency case, for example during an emergency landing, the luggage items stored in the stowage may constitute a danger to the passengers. In order to strengthen the bottom plate of an overhead baggage stowage, reinforcing structures comprised, in particular, of bottom plate profiles are mostly provided, which at the same time serve, for instance, for the suspension of means provided above the passenger seat rows, such as air-conditioning, oxygen supply and lighting. The bottom plate of the overhead luggage stowage is thus strengthened by the reinforcing structures, yet the occurring forces are introduced into the side walls of the stowage and, from there, into the suspension devices and, further on, into the supporting structure of the airplane or the like. This may result in the destruction of the side walls and hence in the opening of the overhead luggage stowages, thus causing the luggage items to crash down or the suspension device provided on the supporting structure of the airplane to pull off.

In order to secure the overhead luggage stowages against crashing down, safety devices which are formed, for instance, by flexible force-deflection elements additionally containing a kinetic energy destruction means are known, which will retain the overhead luggage stowage on the supporting structure of the airplane or the like, even after the suspension device has pulled off. Such a securing device is, for instance, described in EP 0 767 100 A1.

SUMMARY OF THE INVENTION

It is the object of the present invention to provide an overhead luggage stowage, particularly for airplanes, which withstands the static loads caused by the luggage items contained therein, thus eliminating any risk to the passengers sitting below the luggage stowage. Furthermore, the overhead luggage stowage is to be producible in a manner as quick and simple as well as cost-effective as possible while offering a weight as low as possible. The low weight is of special relevance to aircraft because of their fuel consumption.

The object according to the invention is achieved in that at least one rigid connection element is each arranged laterally of the container between the reinforcing structure and the suspension device in a manner substantially vertical in respect to the longitudinal extension of the container. The rigid connection element according to the invention serves as an element for the deflection of force from the bottom of the container via the reinforcing structure(s) to the suspension device(s), thus relieving the overhead luggage stowage and, in particular, its side walls and allowing them to be produced in a simpler and more cost-effective manner. No high demands are, therefore, placed, in particular, on the connections between the side walls of the overhead luggage stowage and the remaining container body. By rigid connection elements, connection elements made of materials that do not undergo any relevant dimensional changes in the event of loads under normal conditions are to be understood. On account of the rigid connection elements arranged between the reinforcing structures and the suspension devices, the overhead luggage stowages are able to withstand elevated static loads. On the other hand, low demands are placed on the manufacture and mounting of the overhead luggage stowage. The number of connection elements is adapted to the maximally occurring load values. The static load is, thus, transferred into the reinforcing structures and the connection elements by the overhead luggage stowage itself. Passengers or the like present below the overhead luggage stowage are thereby protected against crashing-down stowages or luggage items, particularly in extreme situations. By the term "substantially vertical", angular ranges of ±5° relative to the vertical line in respect to the longitudinal direction of the overhead luggage stowage container are to be understood. Safety devices, for instance, as described above and comprised of seat belts or the like may, of course, be employed to further enhance the safety, for instance, at the occurrence of dynamic loads in extreme situations. The invention is applicable to both fixed overhead luggage stowage containers and pivotally or displaceably arranged containers. In the event of pivotally arranged overhead stowage containers, the rigid connection element may be arranged both laterally of the movable container part and laterally of the fixed container part optionally connected with the movable container part.

In a preferred manner, the connection element is positively connected with the reinforcing structure and the suspension device. The form closure ensures the transmission of force from the container via the reinforcing structures into the substantially vertically arranged connection element and, from there, further into the suspension device and into the supporting structure of the airplane or the like.

While the overhead luggage stowage container may be formed by an open stowage compartment, the container advantageously includes a fixed part and a part movably connected with the same.

The movable container part may be comprised of a door articulately connected with the fixed container part. Such an embodiment is common with overhead luggage stowage containers provided in airplanes.

Alternatively, the movable container part may be comprised of a luggage-receiving tray that is movably connected with the fixed container part. Such overhead luggage stowage containers are used to an increasing extent especially in large passenger planes, because the stowage of luggage will be substantially facilitated by the downward pivoting or displacement of the container.

The movement of the tray relative to the fixed container part may be realized by the aid of a joint which allows for a pivotal movement of the tray relative to the fixed container part, or by the aid of a displacement mechanism which allows for a displacement of the tray relative to the fixed container part.

The joint or the displacement mechanism of the movable container part is preferably connected with the suspension device.

According to a further characteristic feature of the invention, it is provided that the tray includes at least one reinforcing structure, and that at least one rigid connection element is arranged between a reinforcing structure and the joint or displacement mechanism, respectively, in a manner substantially vertical in respect to the longitudinal extension of the container. The movable container part formed by a tray is thus equipped with the rigid connection element according to the invention in the same manner as a fixed overhead luggage stowage container, whereby the static loads are transmitted from the side walls of the tray via the connection element and the joint, or the displacement mechanism, into the suspension device and further into the supporting structure of the airplane or the like.

As a rule, at least one carrier arranged in the longitudinal direction of the container and projecting laterally of the container is provided to form the reinforcing structure. Since such carriers are exposed to high bending stresses, they are frequently made in the form of profiles, for instance of light metals like aluminum. The reinforcing structures, however, may also be shaped differently and made of other materials. The carriers are usually connected, for instance glued or screwed, with the lower side of the container. Such structures, in addition to reinforcing the container, also fulfill the functions of force absorption and force deflection.

For the positive connection of the connection element, the latter, according to a further characteristic feature of the invention, comprises openings into which the ends of the reinforcing structure and the suspension devices can be inserted. In order to provide a positive connection between the connection element and the reinforcing structure and the suspension devices, it will do to insert the reinforcing structure and suspension device, respectively, into the respective openings of the connection elements. The forces occurring both in the vertical and in the horizontal direction will be transmitted by the connection elements. Moreover, it is, of course, feasible to use fastening means such as screws or the like and provide a positive and force-transmitting connection between the connection element and the carriers and suspension devices, respectively. A detachable connection, however, offers the advantage that mounting and dismounting will be realized in a substantially quicker and simpler manner and the retrofitting of, for instance, an airplane or the like, e.g., the conversion of a passenger plane into a freight plane, will be more rapidly feasible.

The reinforcing structures need not be realized by separate structural components, but can also be formed by a part of the container itself, for instance, by a reinforced bottom plate.

In order to reduce the weight of the connection element, it may comprise holes, recesses or the like. These holes, recesses or the like are preferably provided on points where minimal forces occur.

In order to prevent the overhead luggage stowage container from slipping relative to the connection elements, the connection elements can be connected, for instance glued or screwed, with side walls of the fixed container part, or the movable container part formed by a tray. Although this means an increase in the work involved in mounting, slipping will be prevented also in a direction in the vertical plane relative to the longitudinal extension of the container.

The side walls are preferably made of fiber-reinforced plastic composites through sandwich construction with cores made of honeycomb materials.

The side walls of the container are preferably glued with the fixed container part, or the movable container part formed by a tray, no high demands being placed on said connection. Like the container parts, also the side walls may, for instance, be made of plastics through sandwich construction and connected with one another by simple adhesive connections. Complex connections between the side walls and the container parts via additional overlapping fiberglass-reinforced plastic layers are not required. Production costs and also the weight of the overhead luggage stowage containers will, thus, be drastically reduced.

It is likewise feasible to produce the connection element and the reinforcing structure in one piece. Thus, a structure is formed, on which the overhead luggage stowage container is more or less placed and secured against lateral slipping by the connection of the reinforcing structure, for instance, with the bottom plate of the container.

The connection elements may be made of metals, preferably light metals, plastics and, in particular, fiber-reinforced plastics, or plastics produced by resin injection methods. Various thermoplastics or thermosetting plastics, which may be reinforced with glass or carbon fibers, are suitable as plastics. The material will be chosen as a function of the respective requirements.

In order to avoid any uncontrolled reaction of the overhead luggage stowage container in extreme situations, for instance during emergency landings of airplanes, the reinforcing element may include predetermined breaking points, and means for destroying kinetic energy may be connected to the ends of said predetermined breaking points. Consequently, the selective destruction of the reinforcing elements upon exceeding of the load will be ensured and the crashing down of the overhead luggage stowage container will be prevented by the device for destroying kinetic energy. The kinetic energy may, for instance, be realized by a looped belt or by an elastic element or by a specially provided tissue.

In order to provide additional safety, at least one flexible belt or the like may be arranged between the reinforcing structure and the suspension device, which belt preferably includes a means for destroying kinetic energy. The overhead luggage stowage will thereby be prevented from crashing down even if the suspension device pulls off. The device for destroying kinetic energy may, for instance, be realized in that the belt is arranged over a given length in superimposed loops which are fixed by seams. The seams are designed to tear open at a predetermined load, thus enabling the extension of the effective section of the safety belt. Although the luggage stowage would, thus, be lowered by a certain length in an emergency case, it would not crash down on the heads of the passengers sitting below the overhead luggage stowage.

BRIEF DESCRIPTION OF THE DRAWINGS

In the following, the invention will be explained in more detail by way of exemplary embodiments with reference to the drawings. Therein:

FIG. 2 is a perspective view of an exemplary method for the manufacture of an overhead luggage stowage container of honeycomb-reinforced composite materials;

FIG. 3 is a side view of an overhead luggage stowage container configured according to the invention;

FIG. 5 is a perspective view of a variant of the overhead luggage stowage container according to the invention, comprising a reinforcing structure and connection element formed in one piece; and FIG. 6 illustrates the configuration of a pivotally mounted overhead luggage stowage container.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
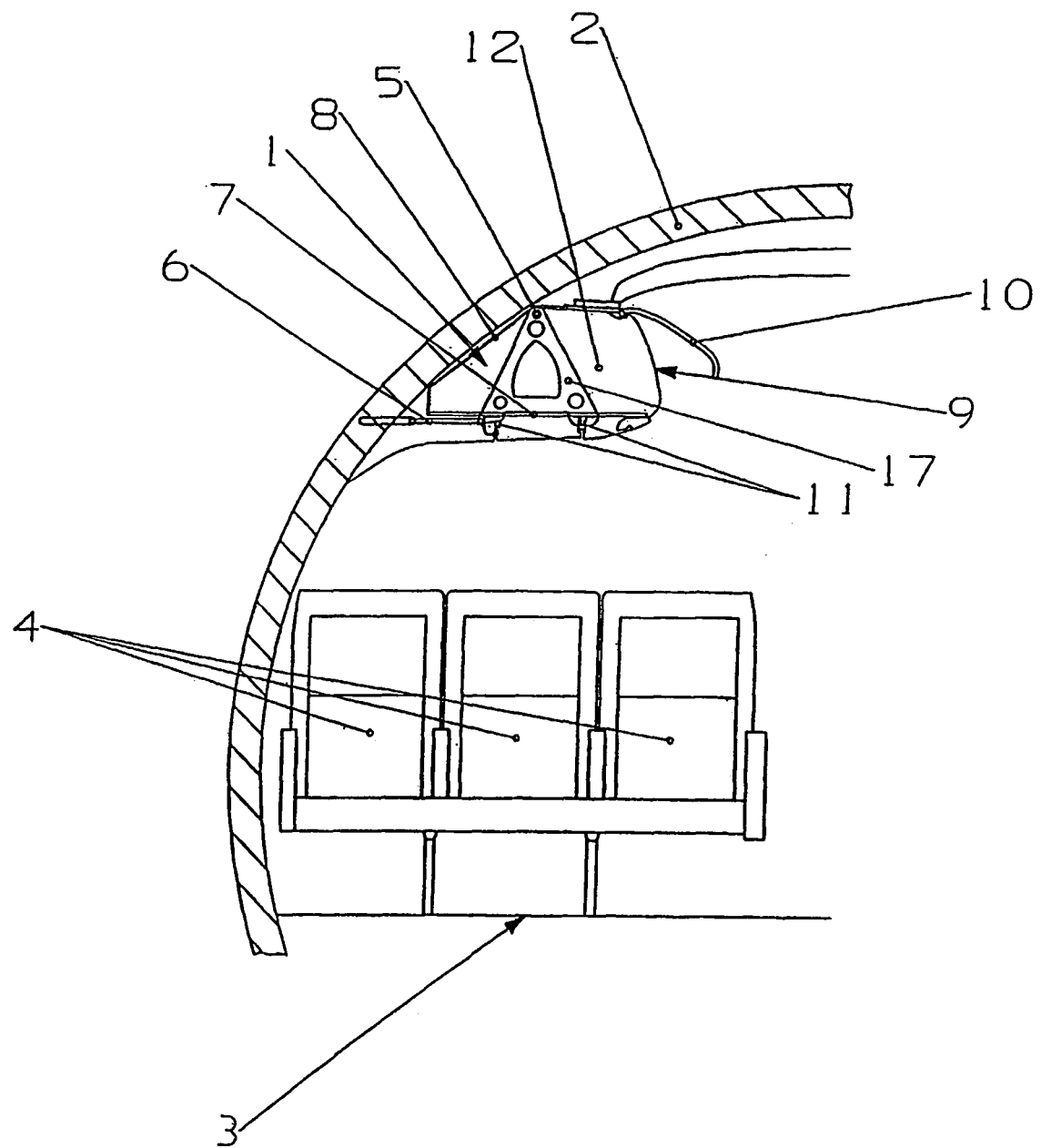
FIG. 1 schematically illustrates the arrangement of an overhead luggage stowage container in an airplane, viewed in cross section through its fuselage.

FIG. 1 illustrates the arrangement of an overhead luggage stowage container 1 in an airplane, viewed in cross section through part of the fuselage 2. Seats 4 are usually fastened to the bottom 3 of the interior of a passenger plane, and the overhead luggage stowage containers 1 are arranged above the seats 4. The containers 1 are usually connected with a supporting structure of the airplane, for instance the fuselage 2, via suspension devices 5. The term supporting structure encompasses any elements directly attached to rigid structures such as, e.g., the fuselage 2. In addition, a further connection by means of a support 6 may be realized between the overhead luggage stowage container 1 and the fuselage 2.

As a rule, the overhead luggage stowage container 1 is comprised of a fixed container part 8 including a bottom plate 7, a rear wall, the upper side and at least a portion of the front side. The fixed container part 8 comprises an opening 9 which is closeable by a flap 10. On the bottom plate 7 of the fixed container part 8, reinforcing structures 11 are arranged, which may be comprised of metal carriers connected, for instance glued or screwed, with the bottom plate 7. Above the passengers' heads, the various lighting, air-conditioning and oxygen-supplying means are arranged on these reinforcing structures 11. Laterally, the fixed container part 8 comprises side walls 12. Luggage items contained in the overhead luggage stowage container 1 exert forces on the bottom plate 7, which are normally deflected into the suspension devices 5 via the side walls 12. As the admissible load limits are exceeded, the suspension devices 5 or the upper side walls 12 are coming off and the overhead luggage stowage container 1, or the luggage items contained therein, may crush down on the passengers' heads. For this reason, the overhead luggage stowage container 1 according to the invention is provided with a connection element 17 between the reinforcing structures 11 and the suspension devices 5, which is aimed to relieve the side walls 12, thus preventing the container 1 from being destroyed.

The invention is not limited to fixed overhead luggage stowage containers 1 as illustrated in FIG. 1, but may also be applied with downwardly pivotable or displaceable overhead luggage stowage containers, which have recently been employed to an increasing extent.

FIG. 2 shows an option of producing an overhead luggage stowage container 1 from a bent-around tray forming the fixed container part 8, which may be made of fiberglass or carbon fiber composites through sandwich construction. A honeycomb core 15 is arranged between two webs 13, 14 of fiber-reinforced plastics. On the folding sites of the fixed container part 8 no honeycomb cores 15 are provided, and the webs 13 and 14 are contiguously disposed. The container part 8 can, thus, be applied on an accordingly shaped mold. The side walls 12 of the container 1 are likewise applied on the mold and, for instance, glued with the container part 8. The production can be effected in an autoclave under heat and pressure. Such a production procedure is extremely complex, since high demands are placed on the side walls 12 and the connection between the side walls 12 and the container part 8.

FIG. 3 is a side view of an overhead luggage stowage container 1 according to the present invention. The container 1 is comprised of a fixed container part 8 including the bottom plate 7. Luggage can be introduced into the container part 8 through an opening 9, which is preferably designed to be closeable. On the upper side of the container part 8, a suspension device 5 is arranged. Reinforcing structures 11 in the form of extruded rail profiles preferably made of metal are arranged along with the bottom plate 7 of the container part 8. The reinforcing structures 11 are connected, for instance glued or screwed, with the bottom plate 7. On the side of the overhead luggage stowage container 1, at least one rigid connection element 17 is further arranged between the reinforcing structures 11 and the suspension device 5. The connection element 17 comprises openings 18 for the positive and force-transmitting connection with the reinforcing structures 11 and the suspension device 5. The connection element 17 is designed with a view to safeguarding the power flow from the reinforcing structures 11 on the bottom plate 7 of the container 1 to the suspension device 5. To reduce weight, holes 19 or recesses 20 may be provided in the connection element 17. These holes 19, recesses 20 or the like are in fact provided on those sites of the connection element 17, where the occurring forces are minimal. The connection element 17 may be made of metal, plastics and, in particular, fiber-reinforced plastics. In order to avoid any uncontrolled reaction of the overhead luggage stowage container 1 in extreme situations, for instance during emergency landings of airplanes, the connection element 17 may include predetermined breaking points 24 formed, for instance, by narrows (illustrated in broken lines). Means aimed to destroy kinetic energy such as, for instance, a looped belt or an elastic element (not illustrated) may be connected to the ends of the predetermined breaking points 24.

Figure 4B:
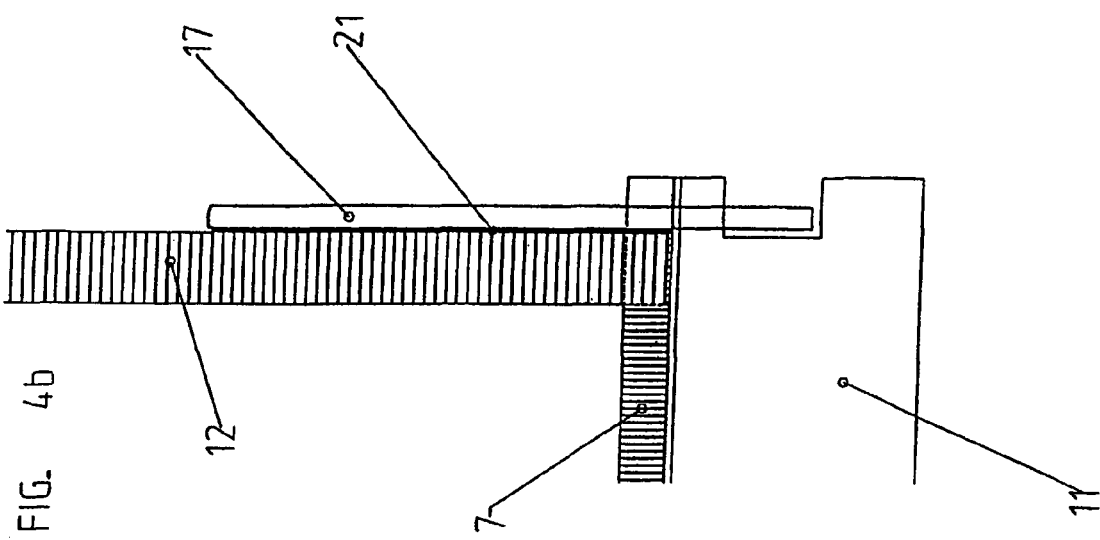
FIG. 4*b* is a side view of the detail from FIG. 4*a*.
Figure 4A:
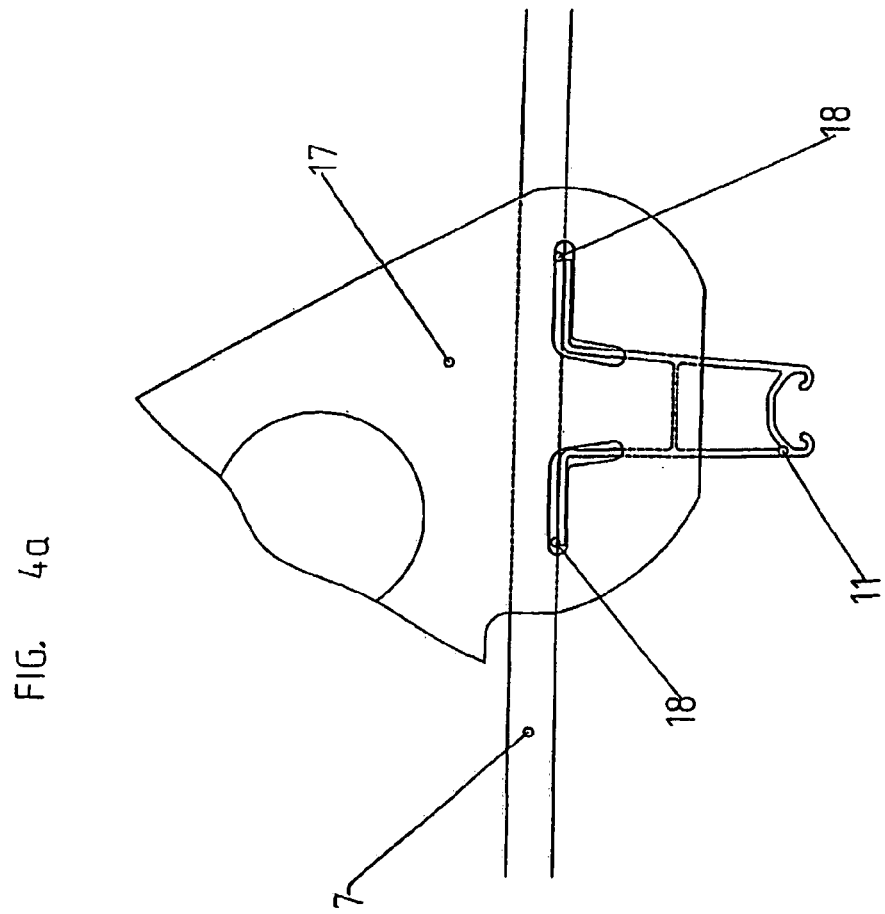
FIG. 4*a* shows the detail IV from FIG. 3, viewed laterally on the overhead luggage stowage container.

FIGS. 4a and 4b in detail show an example of the connection between the connection element 17 and the reinforcing structure 11. For this purpose, openings 18 through which the reinforcing structure 11 or parts thereof can be inserted, are arranged in the connection element 17. The end of the reinforcing structure 11 projecting through the connection element 17 may be additionally fixed, for instance, by the aid of a screw or the like so as to prevent the reinforcing structure 11 from slipping relative to the connection element 17. In addition, an adhesive layer 21 may be provided for connection between the side wall 12 of the container 1 and the connection element 17.

Finally, FIG. 5 depicts a variant of the invention, in which the reinforcing structures 11 and the connection elements 17 are produced in one piece. The reinforcing structure 11 and the connection elements 17 constitute a swing-type structure in which the (schematically illustrated) overhead luggage stowage container 1 is arranged. The suspension devices 5 of the overhead luggage stowage container 1 are inserted, through appropriate openings 18, through the connection elements 17 and connected with the supporting structure of the airplane.

FIG. 6 depicts a variant of an overhead luggage stowage container 1 which is pivotable in a manner that the deposition of luggage items will be facilitated particularly in huge airplanes. The container 1 is comprised of a movable part formed by a tray 22 and including reinforcing structures 11. The reinforcing structures 11 according to the invention are connected with connection elements 17, which are arranged substantially vertical in respect to the longitudinal extension of the container 1. The tray is pivotally connected with the fixed container part (not illustrated) via a joint 23 which may be connected with the suspension device 5 (not illustrated). In the embodiment of a pivotally arranged overhead luggage stowage container 1, both the fixed container part 8 and the movable container part formed by a tray 22 may be provided with the connection elements 17 according to the invention.

The present overhead luggage stowage container 1, particularly for airplanes, withstands increased loads without raising production expenditures for the overhead luggage stowage container 1.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. An overhead luggage stowage container for an airplane, comprising:
   a container part;
   at least one reinforcing structure separate from the container part and arranged substantially in the direction of a longitudinal extension of the container part and supporting a bottom portion thereof;
   at least one device for suspension of said container part from a supporting structure of the airplane; and
   at least one rigid connection element respectively arranged on each side of the container part and extending between the reinforcing structure and the suspension device, said rigid connection elements oriented to be substantially perpendicular to the longitudinal extension of the container part and positively connected with the reinforcing structure and the suspension device.

2. The container according to claim 1, wherein the container part includes a fixed part and a part movably connected with said fixed part.

3. The container according to claim 2, wherein the movable container part includes a door articulately connected with the fixed container part.

4. The container according to claim 2, wherein the movable container part includes a luggage-receiving tray that is movably connected with the fixed container part.

5. The container according to claim 1, wherein the connection elements include openings for the positive connection with the reinforcing structure and the suspension device.

6. The container according to claim 1, wherein the connection elements include holes or recesses.

7. The container according to claim 2, wherein the connection elements are connected with side walls of the fixed container part, or of the movable container part formed by a tray.

8. The container according to claim 7, wherein the side walls are made of fiber-reinforced plastic composites through sandwich construction with cores made of honeycomb materials.

9. The container according to claim 8, wherein the connection elements are glued with the side walls of the fixed container part, or of the movable container part formed by a tray.

10. The container according to claim 1, wherein the connection elements and the reinforcing structure are integrally formed in one piece.

11. The container according to claim 1, wherein the connection elements are made of metal.

12. The container according to claim 1, wherein the connection elements are made of fiber-reinforced plastics.

13. The container according to claim 1, wherein the connection elements include predetermined breaking points.

14. The container according to claim 1, wherein said container part includes at least two side walls coupled to said bottom portion and extending transversely to said longitudinally arranged reinforcing structure, said side walls being spaced from one another to define therebetween, along with said bottom portion, a luggage stowing area; and said at least one rigid connection element being arranged adjacent the at least two side walls of the container, respectively, and oriented to be substantially parallel with said side walls, said rigid connection elements extending between the reinforcing structure and the suspension device and being positively connected to said reinforcing structure and said suspension device so as to relieve the side walls of said container part from forces exerted on said bottom portion by a static load in said luggage stowing area, said rigid connection elements bearing said static load through said positive connection.

15. The container according to claim 14, wherein said rigid connection elements are connected to said side walls.

16. An overhead luggage stowage container for an airplane, comprising:

a container part having a fixed part and a part movably connected with said fixed part, said movable container part including a luggage-receiving tray that is movably connected with the fixed container part;

at least one reinforcing structure connected with the container part and arranged substantially in the direction of a longitudinal extension of the container part;

at least one device for suspension of said container part from a supporting structure of the airplane; and at least one rigid connection element respectively arranged on each side of the container part and extending between the reinforcing structure and the suspension device, said rigid connection elements oriented to be substantially perpendicular to the longitudinal extension of the container part and positively connected with the reinforcing structure and the suspension device.

17. The container according to claim 16, wherein the tray is pivotally connected with the fixed container part via a joint.

18. The container according to claim 16, wherein the tray is pivotally connected with the fixed container part via a displacement mechanism.

19. The container according to claim 17, wherein the joint is connected with the suspension device.

20. The container according to claim 17, wherein the tray includes at least one reinforcing structure, and said rigid connection elements are planar and extend between said tray reinforcing structure and the joint in said substantially perpendicular orientation with respect to the longitudinal extension of the container part.

21. An overhead luggage stowage container for an airplane, comprising:

a container part;

at least one reinforcing structure connected with the container part and arranged substantially in the direction of a longitudinal extension of the container part, said reinforcing structure including at least one metal carrier extending in the longitudinal direction of the container part and projecting laterally of the container;

at least one device for suspension of said container part from a supporting structure of the airplane; and at least one rigid connection element respectively arranged on each side of the container part and extending between the reinforcing structure and the suspension device, said rigid connection elements oriented to be substantially perpendicular to the longitudinal extension of the container part and positively connected with the reinforcing structure and the suspension device.

* * * * *